United States Patent [19]

Hutchins et al.

[11] Patent Number: 4,583,294
[45] Date of Patent: Apr. 22, 1986

[54] COILABLE RULE HOUSING WITH DISCHARGE SLOT FOR DIRT AND THE LIKE

[75] Inventors: Walter J. Hutchins, West Hartford; Mark A. Drechsler, Southington, both of Conn.

[73] Assignee: The Stanley Works, New Britain, Conn.

[21] Appl. No.: 733,080

[22] Filed: May 13, 1985

[51] Int. Cl.⁴ .............................................. G01B 3/10
[52] U.S. Cl. .................................................... 33/138
[58] Field of Search ...................... 33/138, 137 R, 139

[56] References Cited

U.S. PATENT DOCUMENTS

| | | | |
|---|---|---|---|
| 1,216,418 | 2/1917 | Crogan | 33/138 |
| 1,424,085 | 7/1922 | Crogan | 33/138 |
| 2,776,448 | 1/1957 | Trammell, Jr. | 33/138 |
| 3,255,531 | 6/1966 | Anderson | 33/138 |
| 4,479,617 | 10/1984 | Edwards | 33/138 |

Primary Examiner—Willis Little

[57] ABSTRACT

A housing of a coiled tape measuring rule has a bottom wall in which is formed an aperture for the discharge of dirt and other contamination from the enclosure defined therewithin. The aperture has an enlarged inner end to provide an entrance portion for promoting the exit of particulate matter from the housing, while the relatively small outer end inhibits the passage of dirt in the opposite direction.

8 Claims, 4 Drawing Figures

COILABLE RULE HOUSING WITH DISCHARGE SLOT FOR DIRT AND THE LIKE

BACKGROUND OF THE INVENTION

A persistent problem associated with coiled tape measuring rules of conventional construction arises from the entry of dirt into the housing. The dirt tends to produce excessive wear upon the blade faces, and to generally diminish the functional quality of the rule. To a large extent, the problem is attributable to the fact that the blade has an inherent tendency to carry foreign matter into the housing during its retraction.

Proposals have been made in the past for preventing dirt from being introduced into a rule casing in this manner, such as by providing small brush-like components near the opening through which the blade passes, as in Anderson U.S. Pat. No. 3,255,531. It is believed, however, that the arrangement proposed would be of limited effectiveness, and that manufacture of a rule having the feature described in the patent would not be practical on a commercial basis.

Accordingly, it is a primary object of the present invention to provide a novel housing for a coilable measuring rule, and a novel measuring rule employing such a housing, which has means for permitting particulate matter to exit from the housing, so as to thereby reduce resultant wear and functional problems.

A more specific object of the invention is to provide such a housing and rule wherein the means provided for the exit of dirt is very simple and yet highly effective, and also adds virtually no cost or complexity to the manufacturing operations, making the housing and rule most practical to produce on a commercial basis.

SUMMARY OF THE INVENTION

It has now been found that certain of the foregoing and related objects are readily attained by the provision of a housing comprised of opposed sidewalls, and peripheral structure extending thereabout and cooperatively defining an enclosure therewith. The housing has internal means for mounting a spool on which the rule blade is coiled; it has a mouth formed near the base of its front wall, and it has means for guiding the blade from the spool through the mouth for extension from and retraction into the enclosure. The bottom wall of the housing has a relatively small aperture formed through it for the passage of dirt from the enclosure.

In the preferred embodiments, the inner end of the aperture will be enlarged relative to the other end to facilitate the exit, while inhibiting the entry, of foreign matter therethrough. Most desirably, the aperture will be disposed closely adjacent the mouth of the housing, and it may be elongated in the direction of the length of the bottom wall. The guiding means will advantageously include an element disposed to guide the blade across the aperture, in close proximity to its inner end.

Additional objects of the invention are attained by the provision of a coilable tape measuring rule employing a housing having the foregoing features. In addition, the rule will include a spool rotatably mounted within the housing enclosure by the mounting means provided, as well as a rule blade coiled on the spool and having an outer end extending through the mouth of the housing.

DETAILED DESCRIPTION OF THE ILLUSTRATED EMBODIMENT

Figure 1:
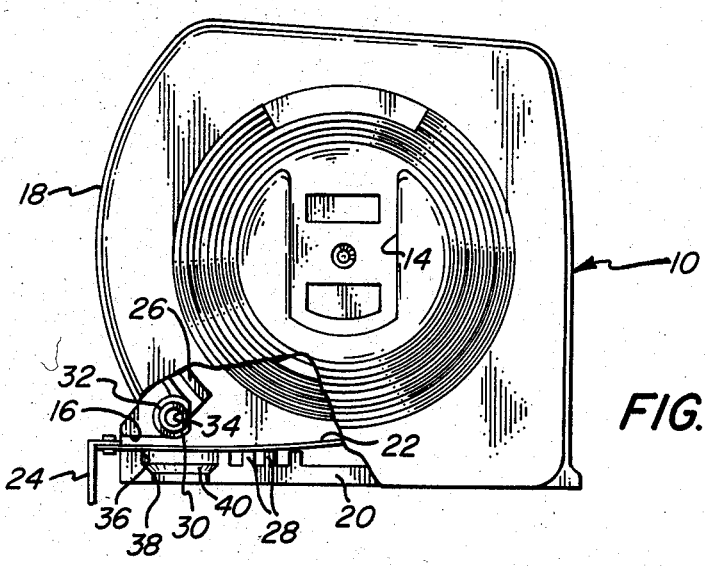
FIG. 1 is a side elevational view of a tape measuring rule embodying the present invention, with a section of the housing broken away to show its unique features.
Figure 2:
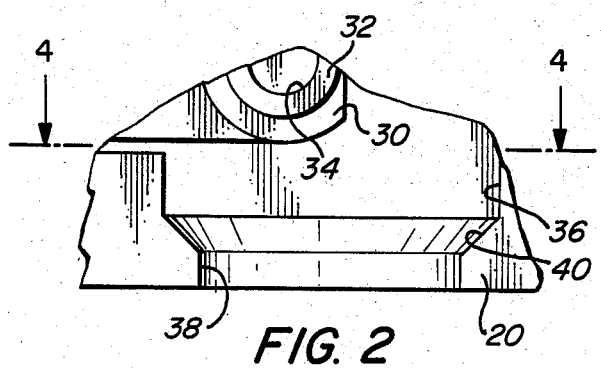
FIG. 2 is a fragmentary view illustrating a section of the housing of the rule of FIG. 1 adjacent the blade opening, drawn to a scale greatly enlarged from that of FIG. 1.
Figure 3:
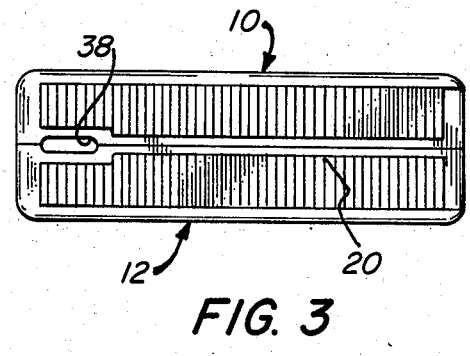
FIG. 3 is a view of the lower face of the case of the rule of FIG. 1, drawn to the scale thereof.
Figure 4:
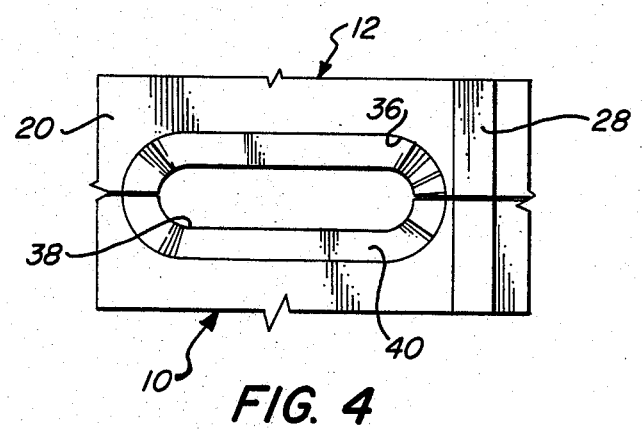
FIG. 4 is a fragmentary sectional view of the bottom wall of the housing, taken along line 4—4 of FIG. 2 and drawn to the scale thereof.

Turning now in detail to the appended drawing, therein illustrated is a tape measuring rule embodying the present invention. The housing or casing consists of two sections, generally designated by the numerals 10, 12, which are, except for the modification to be described, of essentially conventional construction. It should be understood that the measuring rule may be of virtually any type or form; it may for example have a spring-powered or manual return feature, it may be a top-reading mode, etc. Also, the casing may incorporate features such as the recess 14 shown in FIG. 1, which is configured for mounting a supporting clip.

A mouth or blade opening 16 is formed near the base of the front wall 18 of the housing, through which the end of the rule blade 22 projects. As is conventional, the outer end of the blade 22 has an attached hook 24; the blade will usually be of arcuate transverse cross-sectional configuration, and it will of course be provided with a graduated scale on at least one of its faces.

Rules of this type frequently include means for locking the blade in extended positions, and structure for guiding such a locking member (not shown) is seen in FIG. 1 at 26. The bottom wall portions 29 provided (like the portions of the front wall 18) by the two casing halves 10, 12, cooperatively form a series of transversely extending ribs 28, against which the end of the locking member acts to frictionally engage the rule and clamp it in position therebetween.

A transversely extending boss 30, on the end of which is formed a cylindrical element 32, projects inwardly from the casing section 12, and a corresponding cylindrical recess (not shown) is formed in the opposite section 10 to receive the element 32; generally, such a boss will be provided at each of a number of points about the periphery of the housing, and all of them will be formed with bores 34 to receive small screws (not shown), for securing the assembly of the two casing sections. The inner edge of the illustrated boss 30 is flattened to accommodate the lower end of the (unillustrated) locking member, which will abut thereagainst in its inoperative position.

The bottom wall portions 20 of the casing halves 10, 12 are formed to cooperatively provide an elongated aperture when assembled. The aperture consists of straight-walled inner and outer end portions 36, 38, the inner end portion 36 being substantially larger in cross section than the outer end portion 38, and tapering thereinto through a bevelled throat portion 40. This structure provides an enlarged internal entrance to promote passage of dirt from the housing, while limiting the entry of foreign matter through the aperture due to the relatively small dimensions of its outer end portion. As will be appreciated, the removal of dirt will generally occur simply by gravitational effect, during normal usage of the rule. Forming the discharge aperture with a slot-like configuration also enhances its effectiveness; since the slot extends along the length and in the direction of movement of the blade, the shape is optimal in providing an opportunity for dirt to fall into its inner end portion 36.

The location of the aperture near the mouth 16 is desirable from the standpoint of permitting the dirt to drop out before it can be carried into the rule coils and the moving parts of the assembly. However, it may be located elsewhere, such as at a central point on the bottom wall. The effectiveness of the aperture will depend, to some extent, upon the configuration of the bottom wall, which may for example be slightly inclined from the aperture to promote the movement of dirt toward and through it. Finally, in the illustrated form of the housing, the upper and lower surfaces of the blade will tend to be wiped by the boss 30 and the ribs 28, respectively, thus contributing to the effective elimination of foreign matter.

Materials suitable for construction of the casing will be evident to those skilled in the art and need not be described in detail, both metal and also plastic components conventionally being employed. The location of the aperture may however affect the choice of materials, since the opening can weaken the casing, particularly if it is very close to the forward edge of the bottom wall; consistent therewith, it will generally be found that the nearer the aperture is to the blade opening, the better.

Thus, it can be seen that the present invention provides a novel housing for a coilable measuring rule, and a novel measuring rule incorporating it, which has means for permitting particulate matter brought into the housing to exit therefrom, thereby minimizing resultant wear and functional problems. The means provided for the exit of dirt is very simple and yet highly effective, and introduces virtually no cost or complexity into the manufacturing operations; consequently, it is most practical from a commercial standpoint.

Having thus described the invention, what is claimed is:

1. A housing for a coilable tape measuring rule comprised of opposed sidewalls and peripheral structure extending thereabout and defining an enclosure therewith, said peripheral structure including a bottom wall and a front wall, said housing having (i) means therein for mounting a spool on which the rule blade is coiled, (ii) a mouth formed near the base of said front wall, and (iii) means for guiding the blade from the spool through said mouth for extension from and retraction into said housing, said bottom wall of said housing having a relatively small aperture formed therethrough for the discharge of particulate contaminating matter from said enclosure, said aperture being spaced from but closely adjacent said front wall.

2. A housing for a coilable tape measuring rule comprised of opposed sidewalls and peripheral structure, extending thereabout and defining an enclosure therewith, said peripheral structure including a bottom wall and a front wall, said housing having (i) means therein for mounting a spool on which the rule blade is coiled, (ii) a mouth formed near the base of said front wall, and (iii) means for guiding the blade from the spool through said mouth for extension from and retraction into said housing, said bottom wall of said housing having a relatively small aperture formed therethrough for the discharge of particulate contaminating matter from said enclosure, the inner end of said aperture being enlarged relative to the outer end thereof to facilitate the exit, while inhibiting the entry, of particulate matter therethrough.

3. A housing for a coilable tape measuring rule comprised of opposed sidewalls and peripheral structure extending thereabout and defining an enclosure therewith, said peripheral structure including a bottom wall and a front wall, said housing having (i) means therein for mounting a spool on which the rule blade is coiled, (ii) a mouth formed near the base of said front wall, and (iii) means for guiding the blade from the spool through said mouth for extension from and retraction into said housing, said bottom wall of said housing having a relatively small aperture formed therethrough for the discharge of particulate contaminating matter from said enclosure, said aperture being elongated in the direction of the length of said bottom wall.

4. A housing for a coilable tape measuring rule comprised of opposed sidewalls and peripheral structure extending thereabout and defining an enclosure therewith, said peripheral structure including a bottom wall and a front wall, said housing having (i) means therein for mounting a spool on which the rule blade is coiled, having a mouth formed near the base of said front wall, and having means for guiding the blade from the spool through said mouth for extension from and retraction into said housing, said bottom wall of said housing having a relatively small aperture formed therethrough for the passage of particulate contaminating matter from said enclosure, said guiding means including an element disposed to guide the blade thereunder across said aperture and in close proximity to said inner end thereof.

5. A coilable tape measuring rule including: a housing comprised of opposed sidewalls and peripheral structure extending thereabout and defining an enclosure therewith, said peripheral structure including a bottom wall and a front wall, said housing having (i) means therein for mounting a spool on which the rule blade is coiled, (ii) a mouth formed near the base of said front wall, and (iii) means for guiding the blade from the spool through said mouth, for extension from and retraction into said housing, said bottom wall of said housing having a relatively small aperture formed therethrough for the discharge of particulate contaminating matter from said enclosure, the inner end of said aperture being enlarged relative to the outer end thereof to facilitate the exit, while inhibiting the entry, of particulate matter therethrough; a spool rotatably mounted within said enclosure of said housing by said mounting means thereof; and a rule blade coiled on said spool for extension from and retraction into said housing, and having an outer end extending through said mouth.

6. The rule of claim 5 wherein said aperture is disposed closely adjacent said mouth.

7. The rule of claim 5 wherein said aperture is elongated in the direction of the length of said bottom wall.

8. The rule of claim 5 wherein said guiding means includes an element disposed to guide the blade thereunder across said aperture and in close proximity to said inner end thereof.

* * * * *